United States Patent
Wade

(10) Patent No.: US 6,308,835 B1
(45) Date of Patent: Oct. 30, 2001

(54) CONTINUOUS SELF-CLEANING SLUICE

(76) Inventor: Darvin Wade, 5301 Longley La., Bldg. C #107, Reno, NV (US) 89511

( * ) Notice: Subject to any disclaimer, the term of this patent is extended or adjusted under 35 U.S.C. 154(b) by 0 days.

(21) Appl. No.: 09/439,924

(22) Filed: Nov. 12, 1999

(51) Int. Cl.$^7$ ....................................................... B07C 9/00
(52) U.S. Cl. ........................... 209/691; 209/636; 209/645
(58) Field of Search ................................. 209/4, 8, 636, 209/645, 655, 691, 695, 696

(56) References Cited

U.S. PATENT DOCUMENTS

| | | | |
|---|---|---|---|
| 3,682,304 | * 8/1972 | Seidel | 209/443 |
| 3,724,661 | * 4/1973 | Gobatti | 209/437 |
| 4,902,428 | * 2/1990 | Cohen | 210/695 |
| 5,131,996 | * 7/1992 | Birkle et al. | 204/198 |

* cited by examiner

Primary Examiner—Donald P. Walsh
Assistant Examiner—Mark J. Beauchaine
(74) Attorney, Agent, or Firm—Brian C. Kelly, LLM

(57) ABSTRACT

This invention is a moving table for separating valuable heavy particles from an orebearing slurry of heavy consistency. The system uses reversing polarity as well as lateral oscillation. It also uses at least two tables to provide multiple stages of progression.

25 Claims, 4 Drawing Sheets

CONTINUOUS SELF-CLEANING SLUICE

BACKGROUND FIELD OF INVENTION

The invention relates generally to the field of sluice boxes.

BACKGROUND OF INVENTION

The field dates back to the 1800's. It was known from that day to this that gold is an extremely heavy metal and that, given a significant opportunity, gravity will draw down heavy materials. The problem with most sluice boxes has been that they operate at very slow oscillations, which effectively generate a slosh effect which moves the gold along with everything else. Applicant has generated a high oscillation device to overcome the shortcomings of the prior art.

SUMMARY & OBJECTS OF THE INVENTION

A first object of the invention is to generate an oscillation of a box with a floor of uniform but uneven contours.

A second object of the invention is to generate an inexpensive automatic sluice box.

A third object of the invention is to provide a box with adjustable levels to increase or decrease the incline as conditions warrant.

BRIEF DESCRIPTION OF DRAWINGS

FIG. 10 is an isolation view of the top table surface.

DESCRIPTION OF PREFERRED EMBODIMENT

Figure 1:
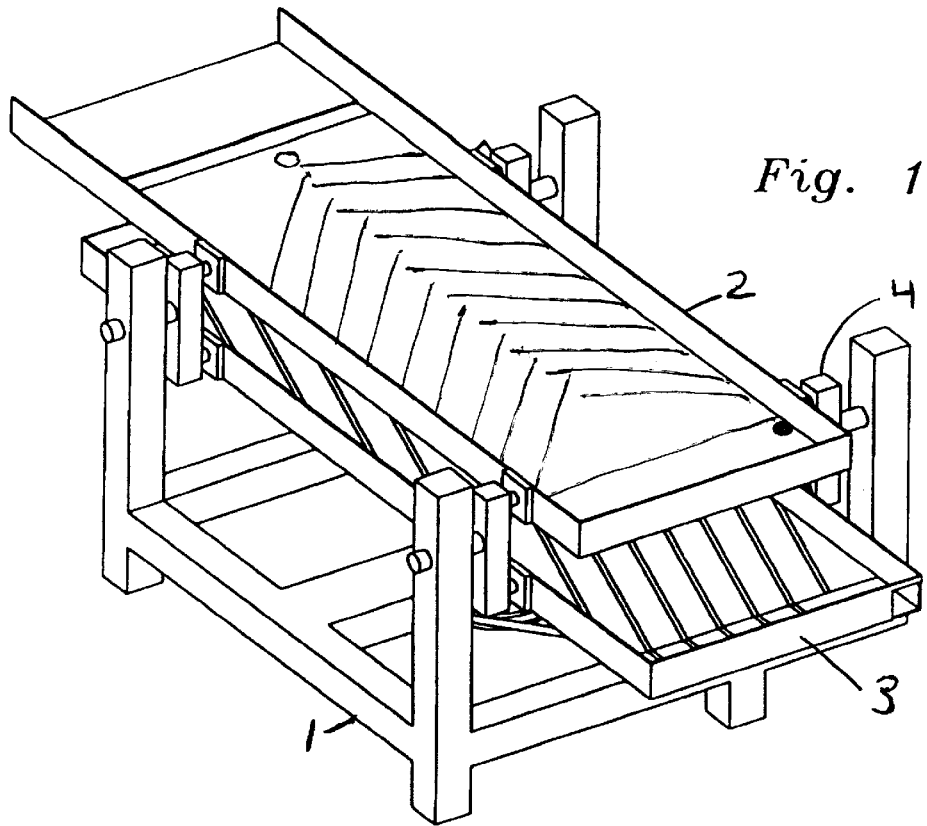
FIG. 1 is a side perspective view of the table and frame.
Figure 2:
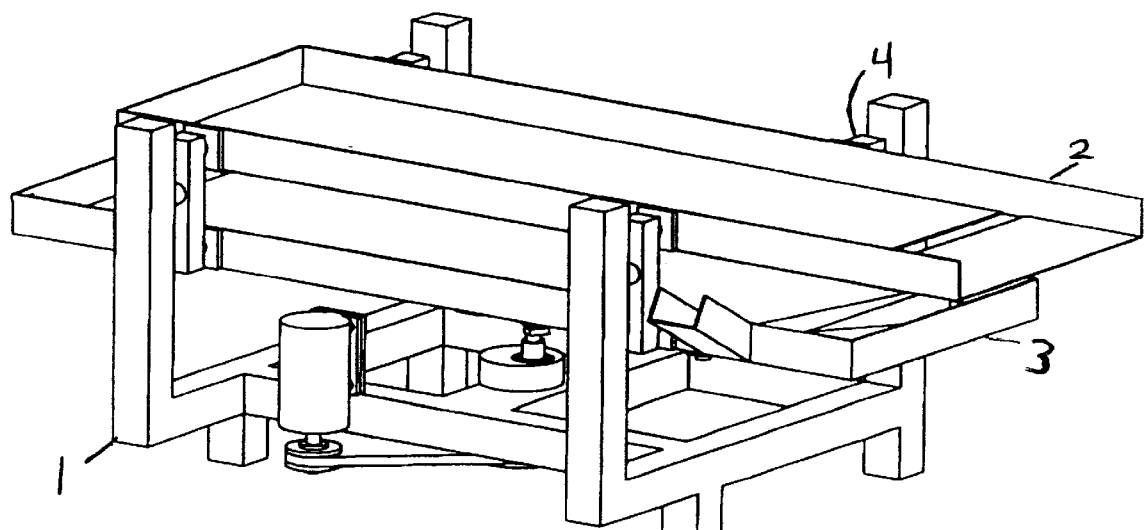
FIG. 2 is a front perspective view of the table and frame.
Figure 3:
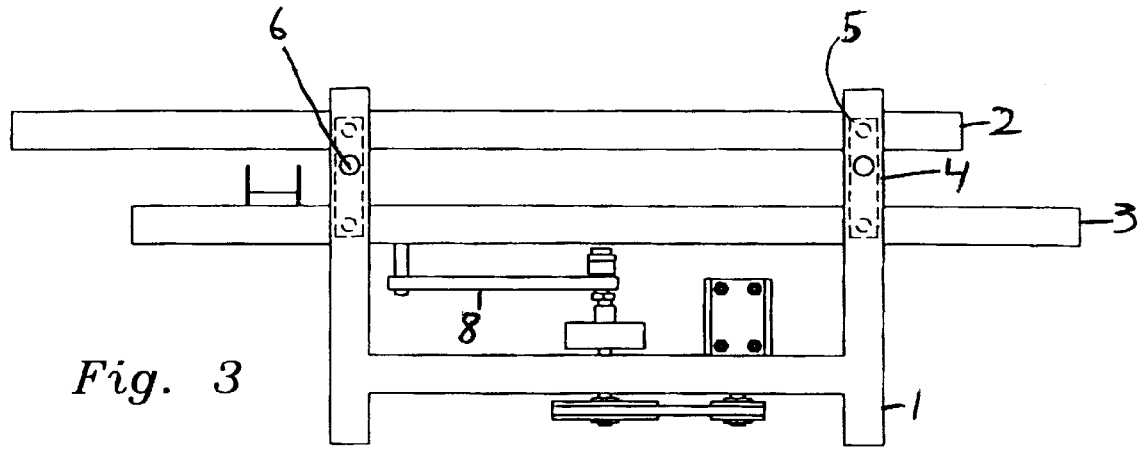
FIG. 3 is a side view of the table.
Figure 4:
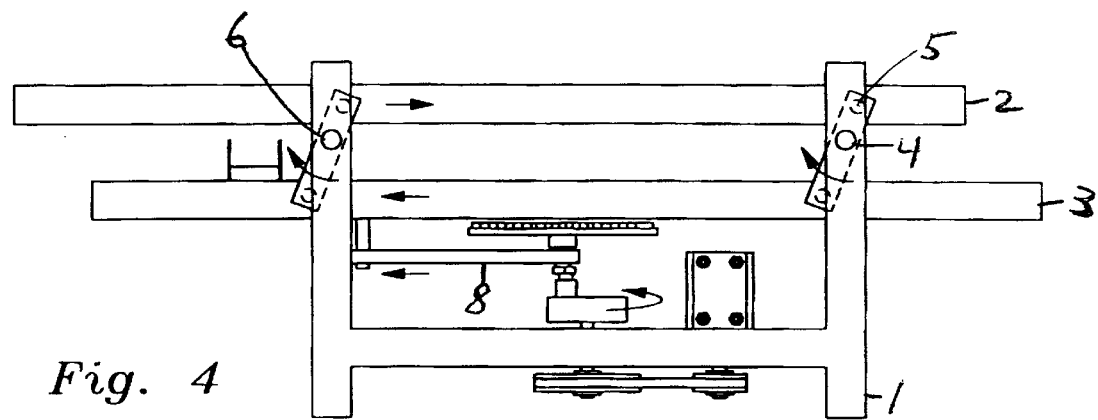
FIG. 4 is a side view of an extended position of the table.
Figure 5:
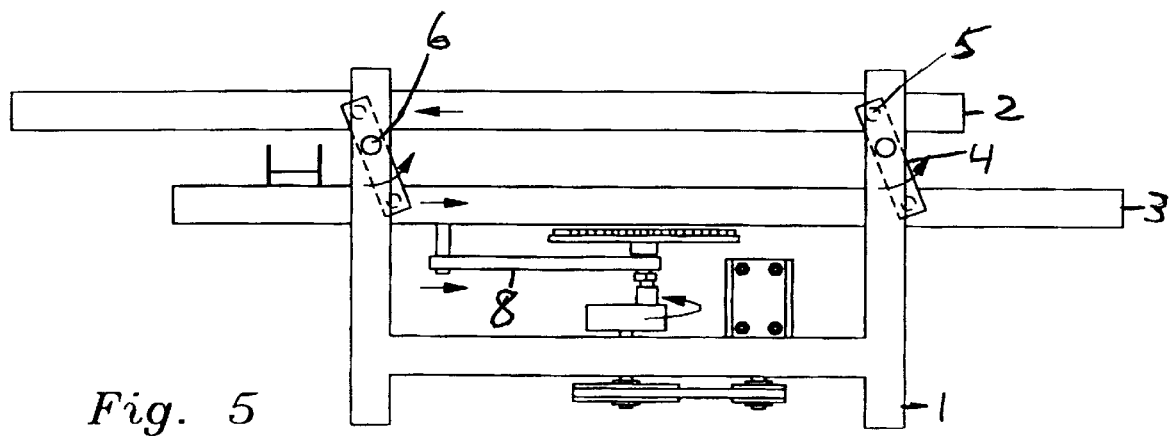
FIG. 5 is a side view of a retracted position of the table.
Figure 6:
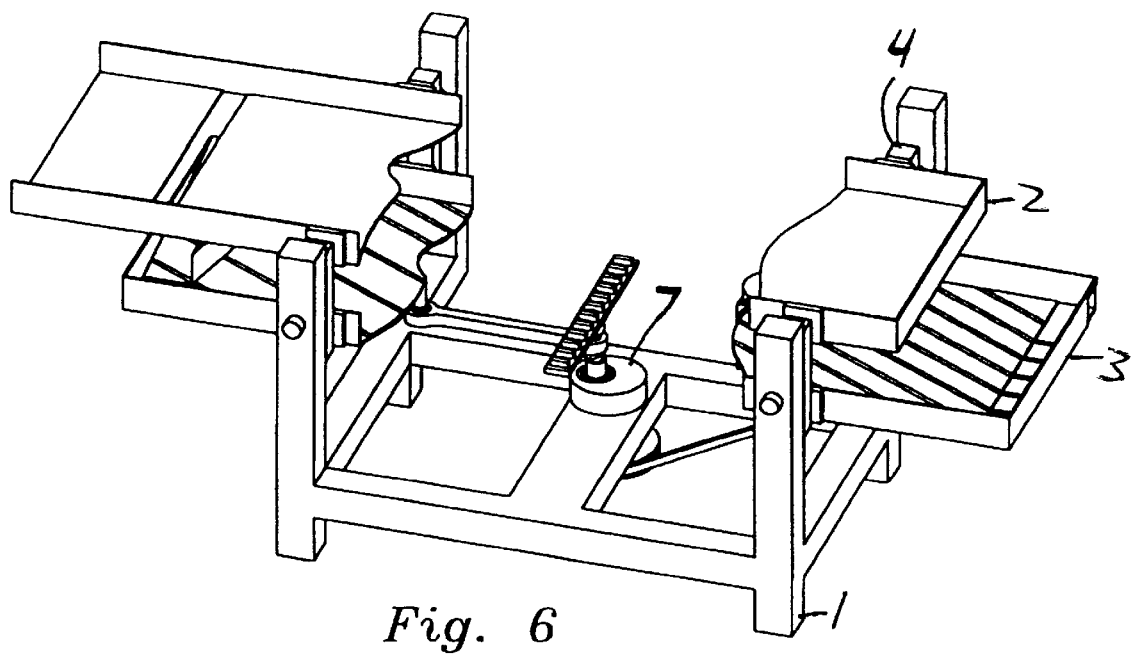
FIG. 6 is a cut-away view disclosing the magnet means.
Figure 7:
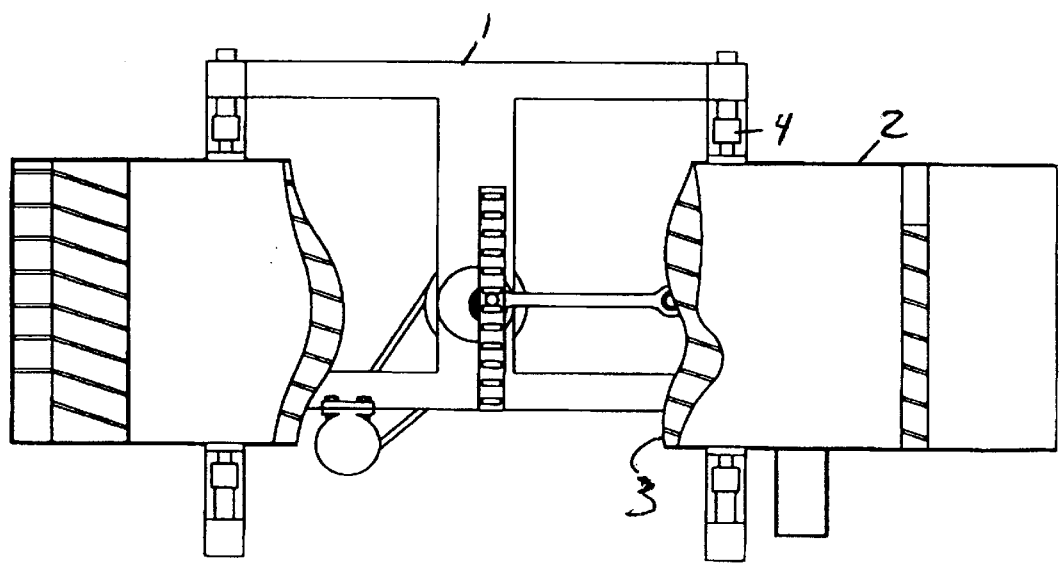
FIG. 7 is a top cut-away view.
Figure 8:
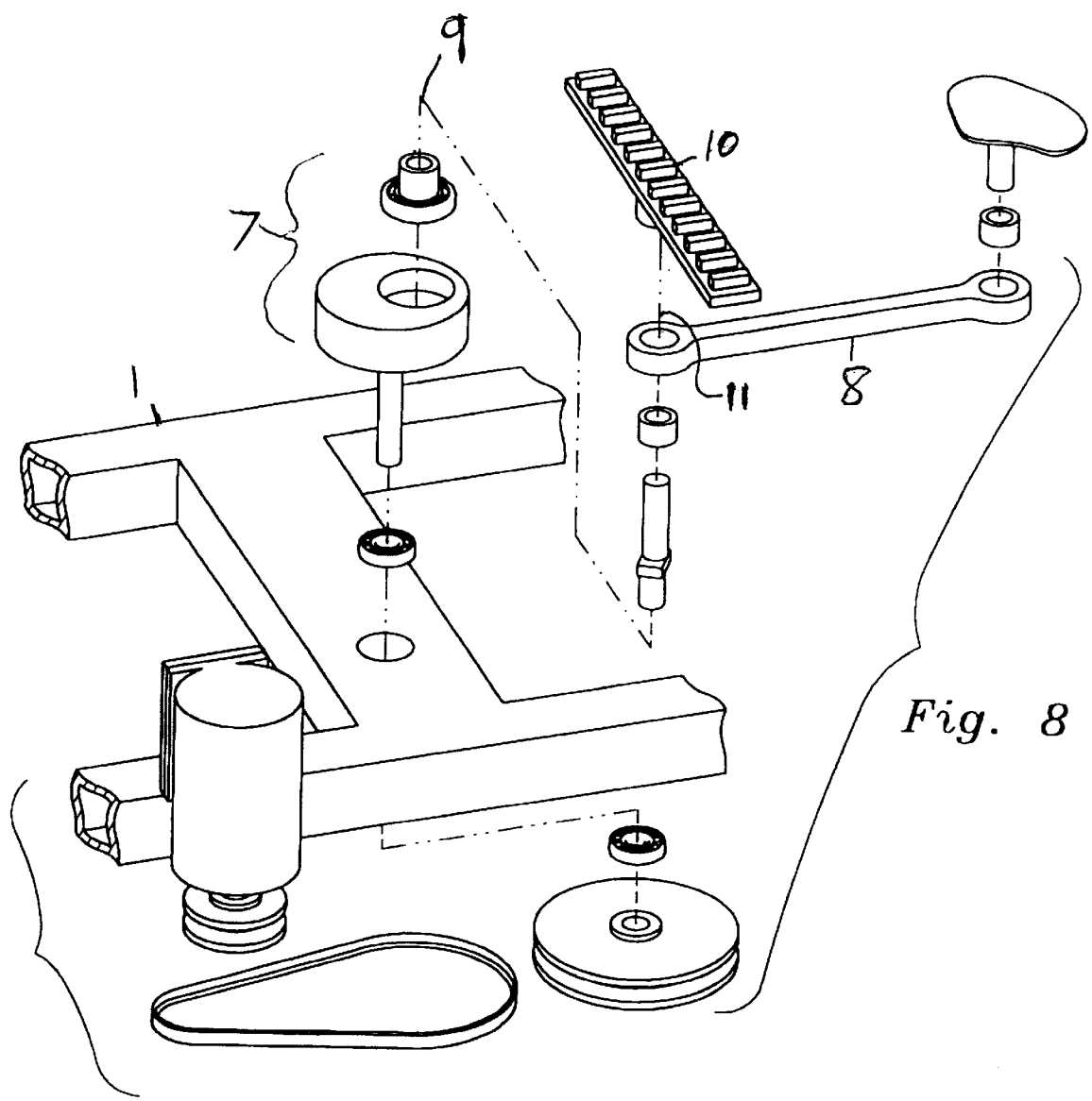
FIG. 8 is an exploded view of the shaft and linkage.
Figure 9:
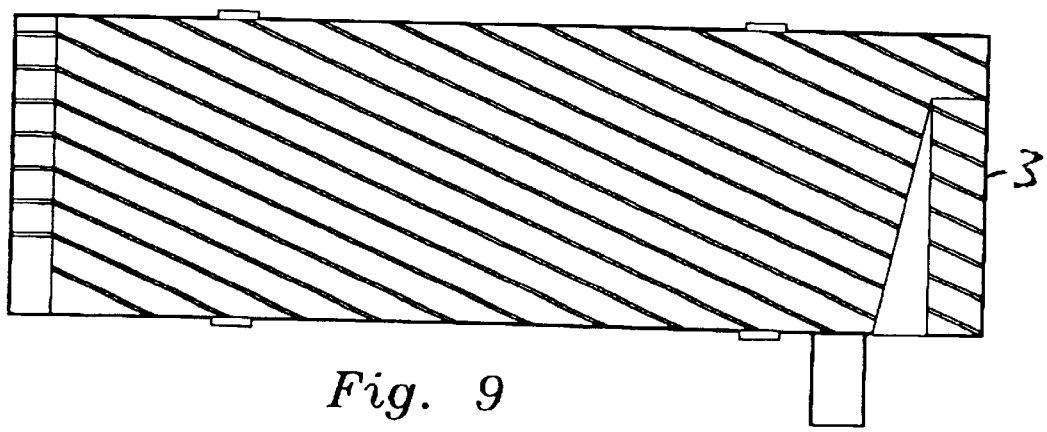
FIG. 9 is an isolation view of the table surface.

On a single framework structure 1 the device includes 2 shaker tables 2 and 3. These shaker tables are connected by pivot connections 4 at each side. The pivot connections 4 are pivotally attached to pivot arms 5 which are pivotally attached to the frame 1 at pivot attachments 6. These tables 2 and 3 thus connected necessarily are driven in opposing directions. Thus, when the lower table 3 is driven north, the upper table 2 necessarily heads south and when the motion of the lower table 3 is reversed the upper table 2 reverses as well. The lower table 3 is driven by a nonconcentric bearing packet 7 with a crank shaft 8. Thus, when the nonconcentric bearing packet 7 and the shaft 8 attached thereto is rotated, the central axis of the bearing 9 in the packet 7 has lateral movement to the extent of the eccentricity. With the connecting linkage, the motion is amplified.

In an alternate embodiment below lower table 3 is a bar 10 with magnets attached thereto. This bar 10 rotates about axis 11. The rotation of the magnets cause a shift in the polarity under the table causing the iron particles to agitate and assisting in removing the particles from the slurry. The gold, on the other hand, is not affected.

Obviously, numerous (additional) modifications and variations of the present invention are possible in light of the above teachings. It is, therefore, to be understood that within the scope of the appended claims, the invention may be practiced otherwise than as specifically described herein.

What is claimed is:

1. A shaker table comprising at least 2 planar members linking means such that motion in a first member causes motion in a second member in an opposite direction, a frame supporting said members, and actuation means for driving one of said planar members.

2. A table as described in claim 1 further comprising an eccentric plate driven rotationally by said actuation means to create lateral movement of said first member.

3. A table as described in claim 2 further comprising a crank shaft means for translating the motion of said eccentric plate into planar lateral motion of said planar member.

4. A table as described in claim 3 wherein said planar member comprises a rippled surface.

5. A table as described in claim 4 wherein said actuation means is an electric motor.

6. A table as described in claim 4 wherein said actuation means is a hydrocarbon fuel operated motor.

7. A table as described in claim 4 wherein said actuation means is water powered.

8. A table as described in claim 4 wherein one of said planar members further comprises a screen for sifting out stones or nuggets from a slurry.

9. A table as described in claim 1 wherein said planar members engage in a lateral oscillation motion.

10. A table as described in claim 1 further comprising magnetic means for agitating iron particles to assist the separation process.

11. A table as described in claim 10 wherein said magnetic means comprises at least one magnet disposed below at least one of said planar members which moves in a rotary fashion.

12. A stacked, combination self-cleaning sluice and finish concentrating table for gravity separating heavy material from lighter material:

means for trapping coarse heavy material in a primary trap, means for discharging coarse heavy material trapped in primary holding trap, means for discharging over-sized coarse material to tailings using screens, means for continuous cleaning of sluice deck using riffles with open spaces, means for discharging heavy concentrate from oscillating sluice to a finish concentrating table, means for cleaning magnetic particles from concentrate, means for oscillating two horizontal table decks in opposite directions while in a stacked mode using a rocker device, means for driving a sluice and finish concentrating table combined, using an eccentric to create a gentle forward motion and compounded to a rapid return motion, longitudinally.

13. A sluice of claim 12 wherein said means comprises a heavy material trap installed at the feed end of said sluice, said heavy material trap comprising a box, which contains a barrier the full width of said sluice, said barrier is high enough to retain all heavy material.

14. A sluice of claim 13 wherein said heavy material box comprising a discharge port for discharging trapped heavy material, said heavy material box comprising a cap on said discharge port.

15. A sluice of claim 14 wherein includes screens generally overlying a riffled portion of said sluice.

16. A sluice of claim 15 wherein contains an unbroken concentrate barrier for containing all heavy materials, said concentrate barrier is located close to discharge end of said sluice.

17. A sluice of claim 16 wherein contains a discharge port adjacent to said concentrate barrier.

18. A sluice of claim 17 further includes riffles which are attached to said sluice deck whereby said riffles slope diagonally to discharge end and contain openings for heavy material to exit to said discharge port of said sluice.

19. A sluice of claim 18 further including a riffled portion at the discharge end of said sluice, whereby said riffled portion at the discharged end of said sluice is not screened and will form a trap for heavy material.

20. A sluice of claim 19 wherein including a rocker device for oscillating on a horizontal plane and creating a live bed for concentrating heavy material.

21. A finish concentrating table comprising a magnetic separator, said magnetic separator rotates horizontally below cleaning portion of said finish deck.

22. A finish concentrating table of claim 21 wherein said magnetic separator uses paramagnatism for effecting magnetic particles, said magnetic separator operating in an elliptical polarization.

23. A finish concentrating table of claim 22 comprising a submerged screen mounted at the head end of said finish concentrating table, wherein said submerged screen contains a vertical bent edge at the concentrate side for retaining over-sized material for disposal of tailings.

24. A finish concentrate table of claim 23 comprising a feed sluice sloping down-slope horizontally from a tailings side of said finish concentrating table, wherein said feed sluice is located at a head end of said concentrating table and will aid in making a cleaner concentrate.

25. A finish concentrate table of claim 24 comprising a rocker device for oscillating both said sluice table and said finish concentrating table, wherein said sluice table and said finish concentrate table will oscillate in opposite directions in relation to each other while in a stacked mode.

* * * * *